United States Patent
Kemper

(10) Patent No.: US 7,119,503 B2
(45) Date of Patent: Oct. 10, 2006

(54) TEMPERATURE-TO-COLOR CONVERTER AND CONVERSION METHOD

(75) Inventor: Jonathan T. Kemper, San Diego, CA (US)

(73) Assignee: Directed Electronics, Inc., Vista, CA (US)

( * ) Notice: Subject to any disclaimer, the term of this patent is extended or adjusted under 35 U.S.C. 154(b) by 39 days.

(21) Appl. No.: 11/018,935

(22) Filed: Dec. 20, 2004

(65) Prior Publication Data
US 2005/0162099 A1    Jul. 28, 2005

Related U.S. Application Data

(62) Division of application No. 10/633,472, filed on Aug. 1, 2003, now Pat. No. 6,956,337.

(51) Int. Cl.
G05F 1/00 (2006.01)

(52) U.S. Cl. ............ 315/309; 315/362; 315/312; 362/800; 340/462; 340/636.18

(58) Field of Classification Search .......... 315/362, 315/312, 360, 309, 117, 118, 383; 345/690; 348/673, 655, 656; 362/800; 340/462, 636.18, 340/691.6
See application file for complete search history.

(56) References Cited

U.S. PATENT DOCUMENTS

| | | | |
|---|---|---|---|
| 4,442,424 A * | 4/1984 | Shirasaki et al. ........ 340/462 |
| 4,829,492 A * | 5/1989 | Choi et al. ............ 367/110 |
| 6,016,038 A | 1/2000 | Mueller et al. |
| 6,150,774 A | 11/2000 | Mueller et al. |
| 6,166,496 A | 12/2000 | Lys et al. |
| 6,211,626 B1 | 4/2001 | Lys et al. |
| 6,232,937 B1 * | 5/2001 | Jacobsen et al. ......... 345/87 |
| 6,292,901 B1 | 9/2001 | Lys et al. |
| 6,340,868 B1 | 1/2002 | Lys et al. |
| 6,441,558 B1 | 8/2002 | Muthu et al. |
| 6,459,919 B1 | 10/2002 | Lys et al. |
| 6,528,954 B1 | 3/2003 | Lys et al. |
| 6,548,967 B1 | 4/2003 | Dowling et al. |
| 6,956,337 B1 * | 10/2005 | Kemper ................ 315/307 |
| 2002/0113555 A1 | 8/2002 | Lys et al. |

* cited by examiner

Primary Examiner—Haissa Philogene
(74) Attorney, Agent, or Firm—KC Bean, Esq.; Anatoly S. Weiser, Esq.

(57) ABSTRACT

A color-to-temperature converter senses temperatures of a device, translates the temperatures into light of different colors, and emits or displays the light. The color-to-temperature converter includes a tri-color light emitting diode (LED) assembly with inputs corresponding to red, green, and blue monochromatic LEDs within the assembly. The processor of the converter separately controls the intensity of each monochromatic LED of the assembly, and the outputs of the monochromatic LEDs converge to appear as one color to an observer. In typical operation, the relationship between the temperature input and the converged color imparts to the observer an intuitive understanding of the consequences of the sensed temperatures to operation of the device whose temperatures the converter monitors.

14 Claims, 4 Drawing Sheets

TEMPERATURE-TO-COLOR CONVERTER AND CONVERSION METHOD

REFERENCE TO RELATED PATENT APPLICATIONS

This is a divisional application of U.S. patent application Ser. No. 10/633,472, filed on Aug. 1, 2003, now U.S. Pat. No. 6,956,337.

BACKGROUND OF THE INVENTION

1. Field of the Invention

The present invention relates generally to apparatus and methods for converting parameter indications to light and color indications, and, more particularly, to apparatus and methods for transforming temperature sensor readings into colors and displaying the colors.

2. Background

In many systems a need exists for observing and monitoring temperatures. For example, internal combustion engines are often equipped with temperature gauges. The gauges indicate to the operator of the engine the temperature of the coolant or lubricant of the engine. For a driver of a car, monitoring of the temperature is of secondary importance in comparison to other tasks that the driver needs to perform at the same time. The driver has to drive the car first; monitoring of the gauges comes second. This statement plainly applies to boat operators, pilots, and construction equipment operators. It is therefore important in many applications to provide an easily readable temperature gauge, to allow the person monitoring the temperature to comprehend the gauge's indication after just a quick glance at the gauge.

In other applications, the temperature display is provided to children or other consumers without a technical understanding of the effect of temperature on the operation, safety, or reliability of the device that is being monitored. A mere red zone marking on the face of a dial is not always adequate to inform the consumer of the undesirable consequences flowing from temperatures that are too high or too low. In addition, finer temperature range gradations may be necessary or desirable for proper operation of the monitored device. The display of temperature in these applications should be tailored to the less sophisticated consumers, and it should impart an intuitive understanding of the meaning of the different temperature zones and the consequences that can result from continued operation in these temperature zones. A simple dial gauge, analog or digital, may not suffice in these applications.

A number of devices in existence change color with temperature in a controllable maner. Strips of material or tubes filled with liquids that change color after exposure to a temperature above a preset limit are available. Similarly, materials that change color after exposure to a preset time-temperature integral are also used, for example, for quality control of foods and of biological specimen. Generally, articles made from these materials suffer from one or more of the following disadvantages. First, they are of a slow-reacting variety and do not display temperature changes in real time. Second, they depend upon direct contact with the article whose temperature is being measured; remote observation of such temperature sensors is impractical. Third, the devices change color only within a predetermined range of temperatures, and the range cannot be easily moved up or down the temperature scale, expanded, contracted, or otherwise varied. Fourth, the color spectrum of such devices is limited. Typically, only one or two colors are available. Fifth, these articles are usually passive devices that do not emit light; therefore, they are more difficult to see, especially in the dark, and do not adequately solve the readability problem. Finally, the color change in many such articles is irreversible: they are single-use, disposable temperature indicators.

A need thus exists for devices that allow a person to read a temperature at a glance. Another need exists for easily readable temperature gauges that display real-time temperatures. Still another need exists for easily readable temperature gauges that can be physically separate and remote from the object whose temperature they display. A further need exists for temperature display devices that can be configured to display different temperature ranges with high visibility, in multiple colors, and that overcome the shortcomings of existing technologies.

SUMMARY

The present invention is directed to apparatus and methods that satisfy these needs. The apparatus disclosed is an instrument for displaying temperature as color. The instrument comprises a plurality of color sources, an electronic device, and a color combiner. Each color source is capable of engendering color of a different wavelength and of variable apparent intensity. The intensity of the color source is controlled by a color intensity signal received at an input of the color source, which signal can be a pulse-width modulated or an amplitude modulated signal.

The electronic device of the instrument has an input that receives temperature readings indicative of the temperature to be displayed by the instrument, and circuitry that determines a plurality of color intensity values for each temperature reading. Each color intensity value corresponds to a different color source. Furthermore, the circuitry of the electronic device generates the plurality of color intensity signals to control intensities of the color sources, one color intensity signal per color source. The color intensity signal of the color source is a function of the color intensity value corresponding to the color source. The electronic device also has a plurality of outputs connected to the inputs of the color sources. The color intensity signals appear on these outputs, one color intensity signal per output, so that the color intensity signal corresponding to a color source is coupled to the input of the same color source. Finally, the color combiner converges the multiple colors engendered by the color sources, to make the multiple colors appear as one color to an observer.

Some embodiments of the instrument use a multi-color LED device with two or more constituent LEDs and a lens assembly, to implement, in one unit, the color sources and the combiner. In other embodiments, a color display screen performs the functions of engendering multiple colors and combining them to appear as one color.

The instrument can also include a temperature sensor and an A/D converter. The A/D converter digitizes analog temperature indications generated by the temperature sensor, and provides the digitized indications to the circuitry of the electronic device as temperature readings.

BRIEF DESCRIPTION OF THE DRAWINGS

These and other features and aspects of the present invention will be better understood with reference to the following description, appended claims, and accompanying drawings, where:

DETAILED DESCRIPTION

Figure 1:
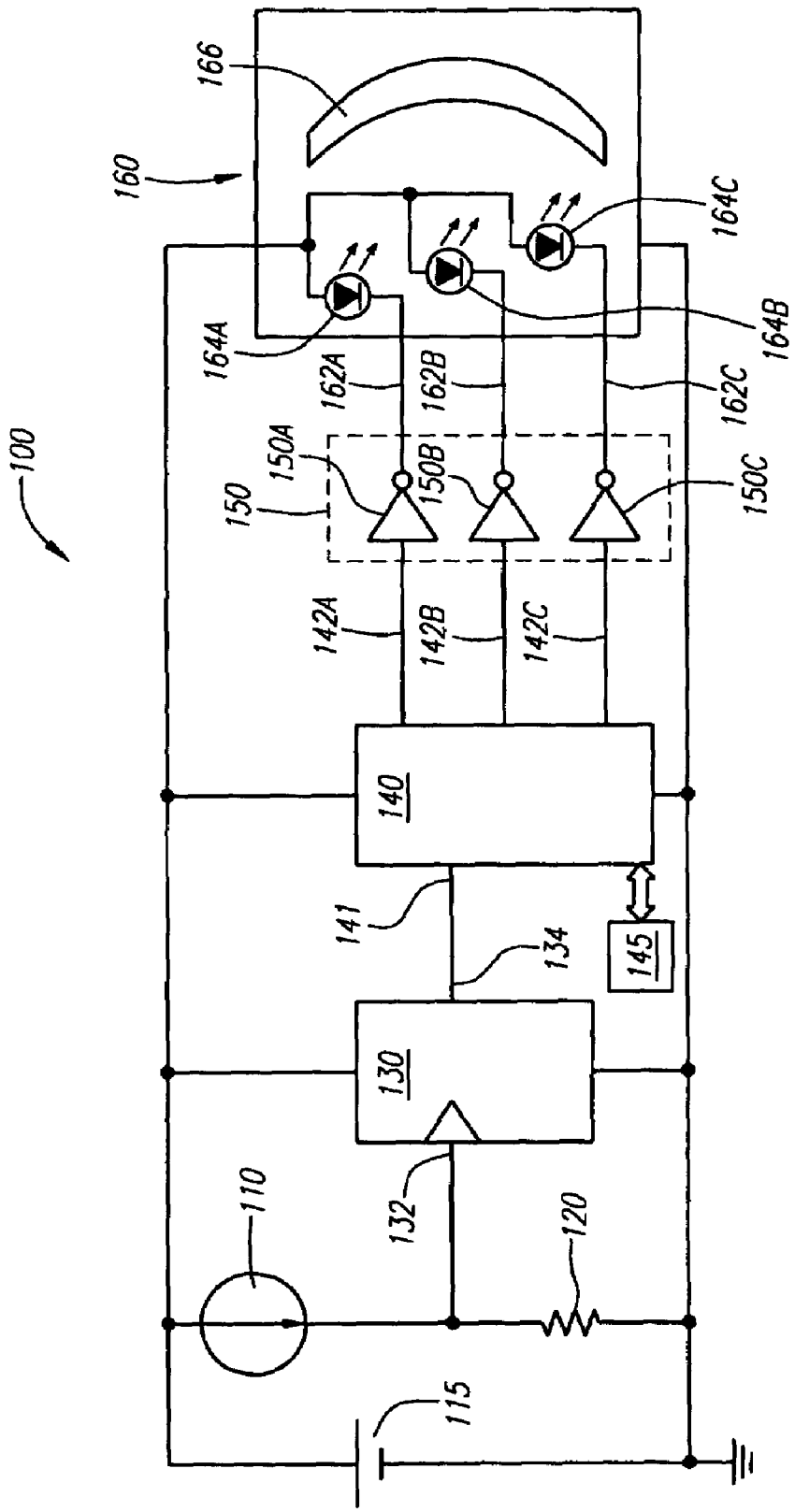
FIG. 1 is a simplified block diagram of a temperature-to-color converter in accordance with the present invention.

Reference will now be made in detail to several embodiments of the invention that are illustrated in the accompanying drawings. Wherever possible, same or similar reference numerals are used in the drawings and the description to refer to the same or like parts. The drawings are in a simplified form and are not to precise scale. For purposes of convenience and clarity only, directional terms, such as top, bottom, left, right, up, down, over, above, below, beneath, rear, and front, may be used with respect to the accompanying drawings. These and similar directional terms should not be construed to limit the scope of the invention in any manner. Note also that the words such as "connect," "couple," and similar terms with their inflections do not necessarily denote direct and immediate connections, but also include connections through intermediate elements or devices.

Referring more particularly to the drawings, FIG. 1 is a simplified block diagram of a temperature-to-color converter 100 in accordance with the present invention. A two-terminal temperature sensor 110 is coupled in series with a resistor 120 and across a voltage source 115. The voltage produced at the junction of the resistor 120 and the temperature sensor 110 is a product of the value of the resistor 120 and the current 1 through the resistor 120. The current 1 depends on the voltage-versus-current characteristic of the sensor 110, which is a function of temperature of the sensor 110. Thus, the voltage at the junction of the resistor 120 and the temperature sensor 110 is a function of the temperature of the sensor 120. I will refer to this voltage as the temperature-indicating voltage.

An analog-to-digital (A/D) converter 130 receives the temperature-indicating voltage at its input 132, digitizes this voltage, and sends the digitized voltage to its output 134. The output 134 of the A/D converter 130 is coupled to an input 141 of a software engine 140, so that the software engine 140 can receive the output of the A/D converter 130.

The software engine 140, executing program code stored in a memory 145, receives and interprets the digitized temperature-indicating voltage, and generates three output signals at software engine outputs 142A, 142B, and 142C. As will become apparent from the discussion below, the three signals on the outputs 142A, 142B, and 142C correspond to intensities of three basic constituent or primary colors (i.e., substantially monochromatic colors that can be combined in variable proportions to create other colors) emitted by the converter 100: red, green, and blue. I will refer to the signals on the outputs 142 as color intensity signals.

Each of the software engine outputs 142A, 142B, and 142C connects to and drives one of buffer circuits 150: the output 142A connects to the buffer circuit 150A, the output 142B connects to the buffer circuit 150B, and the output 142C connects to the buffer circuit 150C. The three buffer circuits 150 connect, in a one-to-one relationship, to-three inputs 162A, 162B, and 162C of a tri-color light emitting diode (LED) 160.

The tri-color LED 160 is a device that includes three substantially monochromatic (single color) constituent LEDs 164A, 164B, and 164C, and a lens assembly 166. Each of the LEDs 164 is connected to and receives driving current from a corresponding input 162. Thus, the signal on the input 162A drives the LED 164A, the signal on the input 162B drives the LED 164B, and the signal on the input 162C drives the LED 164C.

The three LEDs 164A, 164B, and 164C emit red, green, and blue light, respectively. The emitted light passes through the lens assembly 166, which converges (i.e., aligns or combines) the three different colors from the three LEDs 164 at some focal point. In this way, the emissions of the three LEDs 164 can mix together and appear as light of one color to an observer's eye. Because a person skilled in the art of color generation and display can produce practically any color by mixing the red, green, and blue light emissions (or other primary color emissions) in varying intensities, appropriate modulation of the three LEDs 164 can cause the LED 160 to produce a multitude of different colors. See, for example, U.S. Pat. No. 6,441,558 to Muthu et al.; U.S. Pat. No. 6,016,038 to Mueller et al.; U.S. Pat. No. 6,150,774 to Mueller et al.; U.S. Pat. No. 6,166,496 to Lys et al.; U.S. Pat. No. 6,211,626 to Lys et al.; U.S. Pat. No. 6,292,901 to Lys et al.; U.S. Pat. No. 6,340,868 to Lys et al.; U.S. Pat. No. 6,459,919 to Lys et al.; U.S. Pat. No. 6,528,954 to Lys et al.; U.S. Pat. No. 6,548,967 to Dowling et al.; U.S. Pat. No. to Lys et al.; and U.S. patent application Ser. No. 09/742,017 by Lys et al. (publication number 20020113555, published on Aug. 22. 2002). These documents are hereby incorporated by reference as if fully set forth herein.

In operation, the temperature-indicating voltage varies with the temperature being monitored, be it the ambient temperature or the temperature of an object that is in contact with the temperature sensor 110. The A/D converter 130 receives the temperature-indicating voltage, periodically (e.g., continually) digitizes it, and outputs the digitized representation of the temperature-indicating voltage to the software engine 140 through the output 134 of the A/D converter 130 and the input 141 of the software engine 140. Although the connection between the output 134 and the input 141 is schematically shown in FIG. 1 as a single line, it is a multi-line digital bus connection in the converter 100. In alternative embodiments, the output of the A/D converter 130 can also be transmitted serially over a single line.

The temperature sensor 110 used in the temperature-to-color converter 100 is an Analog Devices temperature transducer p/n AD592. It is a temperature-controlled current source. Within the device's operating range, the current through it increases linearly with the absolute (Kelvin) temperature, largely independent of the potential difference between the terminals of the sensor 110 and of other parameters. The linear current-temperature dependence of the device permits simplification of the algorithm used to translate the temperature-indicating voltage into temperature. In other embodiments in accordance with the present invention, the temperature sensor is implemented, for example, as a thermistor, a diode, a thermocouple, or a resistance temperature device (RTD). Such sensors can be configured similarly to the configuration of the current source 110 of the embodiment illustrated in FIG. 1, i.e., in series with a resistor and across a voltage source. A wide variety of other configurations of the temperature sensors are of course also available. As one example of such alternative configurations, the relative positions of the temperature sensor and the series resistor can be interchanged. The temperature sensor is then connected between one end of the resistor and the ground, while the second end of the resistor connects to the voltage source.

Whatever the nature of the temperature sensor 110, given its temperature characteristic and a description of other circuit components affecting the temperature-indicating voltage, the software engine 140 translates the digitized voltage into a temperature reading. Next, the software engine 140 determines the color to be output by the LED 160, based on the temperature of the sensor 110. In the illustrated embodiment, the color corresponds to three color intensity values: red, green, and blue. Each color intensity value determines the duty cycle of one of the color intensity signals at the outputs 142.

Note that the processing of the digitized temperature-indicating voltage need not be any more complicated than a simple table look-up operation that correlates various temperature-indicating voltages to temperatures of the sensor 110. Moreover, the processing of the digitized temperature-indicating voltage and the determination of the color to be output by the LED 160 can be combined into a single step. For example, the software engine 140 can directly perform a table look-up operation to determine the color of the LED 160, using the digitized temperature-indicating voltage as a pointer to the color intensity values for the LEDs 164. When this is done, the step of processing the digitized temperature-indicating voltage to obtain the monitored temperature is effectively omitted altogether.

In the temperature-to-color converter 100, the software engine 140 is an 8-bit microprocessor operating under control of the program code stored in the memory 145, which is an external read-only memory (ROM) device. In other embodiments, the software engine 140 is implemented as a microcontroller that carries both the ROM 145 and the A/D converter 130 on board the same integrated circuit semiconductor device.

However, implemented, the combination of the software engine 140 and the A/D converter 130 can monitor the temperature of the sensor 110 practically continuously, and adjust in real time the color output of the tri-color LED 160 to reflect the changes in the temperature.

The color intensity signals on the outputs 142 control the state of the buffer circuits 150. Through the buffer circuits 150, the color intensity signals also control the current through the three LEDs 164 of the tri-color LED 160, in a one-to-one relationship. In the temperature-to-color converter 100, each of the buffer circuits 150A, 150B, and 150C is a transistor capable of continuously sinking about 50 ma. For duty cycles under 100%, the transistor can source as much as 2 A of current, and sometimes even more.

In alternative embodiments, the buffer circuits 150 are implemented as dedicated digital drivers, optionally residing on a single integrated circuit device. The buffer circuits 150 can also be configured to source the currents flowing through the LEDs 160, instead of sinking these currents. Moreover, the buffer circuits 150 can be configured to drive the LEDs 164 in both Y and delta arrangements.

Note that the use of the buffer circuits 150 is optional. Their function is to provide higher currents through the LEDs 160 than the outputs 142 of the software engine 140 can source or sink directly. In this way, the LED 160 emits brighter light than would be possible without the use of the buffer circuits 150.

There is at least one other reason why it may be desirable to increase the drive current through the LEDs 164: energy efficiency. Because of the way the human eye perceives light and color, higher intensities of light during proportionally lower duty cycles appear as brighter colors, notwithstanding the fact that the root-mean-square (RMS) intensity of the light remains constant. Thus, increasing the drive current through the LEDs 164 allows a disproportionate decrease in the duty cycle of the color intensity signals. This scheme allows a reduction in the energy consumed, while maintaining the apparent intensity of the LEDs 164.

The software engine 140 modulates the duty cycles of each of the digital signals on its outputs 142A, 142B, and 142C. In the illustrated embodiment, these outputs are part, of a standard input/output (I/O) port of the microprocessor of the software engine 140. The software engine 140 periodically writes to the I/O port a word having ones and zeros in positions corresponding to the three outputs 142, as needed to generate the three color intensity signals of desired duty cycles on these outputs. The timing of the write operations can be controlled, for example, by a programmable interrupt of the software engine, or by frequent reading of the real-time clock, which can be either internal or external to the microprocessor.

In variations of the temperature-to-color converter 100, the software engine 140 employs on-board timers to generate pulses on the outputs 142.

The frequency of modulation of the outputs 142 is about 60 Hz, but this number is not critical to the operation of temperature-to-color converters in accordance with the present invention. In alternative embodiments, the modulation frequency varies widely. More specifically, the modulation frequency is between about 25 Hz and about 50 KHz in some embodiments. This frequency range allows the on and off toggling of the LEDs 164 to be ignored by a typical observer, while the keeping the required frequency performance and concomitant cost of the components reasonable.

Figure 2:
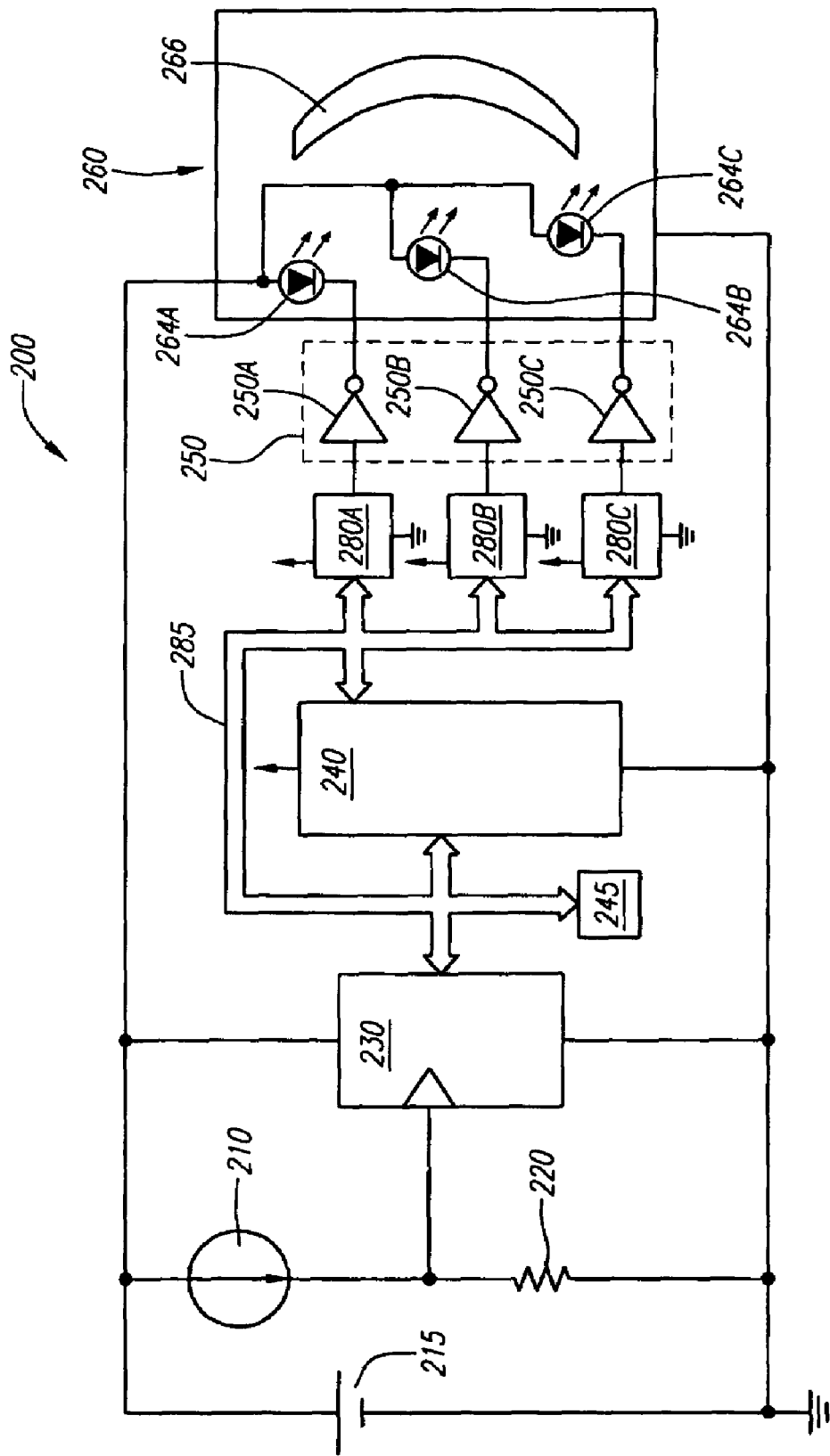
FIG. 2 is a simplified block diagram of a temperature-to-color converter that uses pulse-width modulators, in accordance with the present invention.

FIG. 2 is a simplified block diagram of a temperature-to-color converter 200 in accordance with the present invention. In most respects the converter 200 is similar to the converter 100, and most components of the two converters function similarly, too, including a voltage source 215, a temperature sensor 210, a resistor 220, an A/D converter 230, buffer circuits 250, and a tri-color LED 260 with its three individual monochromatic LEDs 264 and a lens assembly 266. Here, however, the temperature-to-color converter 200 also includes three pulse-width modulators 280A, 280B, and 280C. Each of the modulators 280 is coupled to the software engine 240 through a common data and control bus 285, so that the software engine 240 can write data into the modulators 280 via the bus 285. The A/D converter 230 also communicates with the software engine 240 via the bus 285.

As in the temperature-to-color converter 100, the A/D converter 230 digitizes the temperature-indicating voltage generated at the junction of the temperature sensor 210 and the resistor 220. The software engine 240 reads the digitized temperature-indicating, voltage, and processes it to compute three color intensity signals for the individual monochromatic LEDs 264. The software engine 240 then performs write operations to the three pulse-width modulators 280, programming the modulators to output the pulses with duty cycles corresponding to the three color intensity signals. The modulators 280 output the pulses to the buffer circuits 250, which in turn drive the individual LEDs 264. Emissions from the LEDs 264 pass through the lens assembly 266 and converge, blending into one perceived color.

In the temperature-to-color converter 200, the pulse-width modulators 280 are processor-controlled, programmable modulators, such as Dallas Semiconductor part number DS1050. In variations of this design, analog pulse-width modulators, such as the industry standard LM3524, are used in lieu of the programmable modulators.

Physically, the converter 200 is divided into two major parts. The first part includes the temperature sensing and converting components: the sensor 210, resistor 220, and A/D converter 230. This part is located proximate to the object being monitored. The second part, that is the software engine 240, pulse-width modulators 280, buffer circuits 250, and tri-color LED 260 are near the location of the person monitoring the temperature of the object. The first part and the second part of the converter 200 communicate through the bus 285. The temperature sensor is therefore "remote," by which I mean that it would be impractical for a person (to whom the LED 260 is displayed) to observe the LED 260 if the LED 260 where located near the temperature sensor.

Note that this division of the converter 200 into two parts is optional. In some embodiments of a temperature-to-color converter in accordance with the present invention, only the temperature sensor is located near the object being monitored. In other embodiments only the LED 260 (or another display device) is located near the person monitoring the temperature of the object. And, of course, the converter 200 can be physically and functionally divided along other lines, or built as a single, undivided unit.

Wherever the line is drawn dividing the two parts of a temperature-to-color converter in accordance with the present invention, communications between the two parts are not limited to an electrical bus such as the bus 285 of the converter 200. In some embodiments in accordance with the present invention, the two parts communicate wirelessly, using, for example, a WI-FI, Bluetooth, or a wireless Echelon link. In other exemplary embodiments, the two parts communicate over a fiberoptic cable.

Furthermore, the communication link between the two parts of the converter can support signals in addition to those needed for the operation of the temperature-to-color converter. In one embodiment, the temperature sensor is attached to an audio amplifier installed in a trunk of a car, while the tri-color LED is installed on the dashboard of the car. The amplifier is programmable, having input/output impedances, gain control, and channel (equalizer) functions that can be set by writing into memory locations within the amplifier. In this embodiment, the link between the temperature sensor and the processor that controls the operation of the temperature-to-color converter caries the digitized temperature readings from the temperature sensor to the processor. The same link also carries amplifier programming data from the processor to the amplifier. Note that one device serves as the audio system processor and the temperature-to-color converter processor at the same time.

Figure 3:
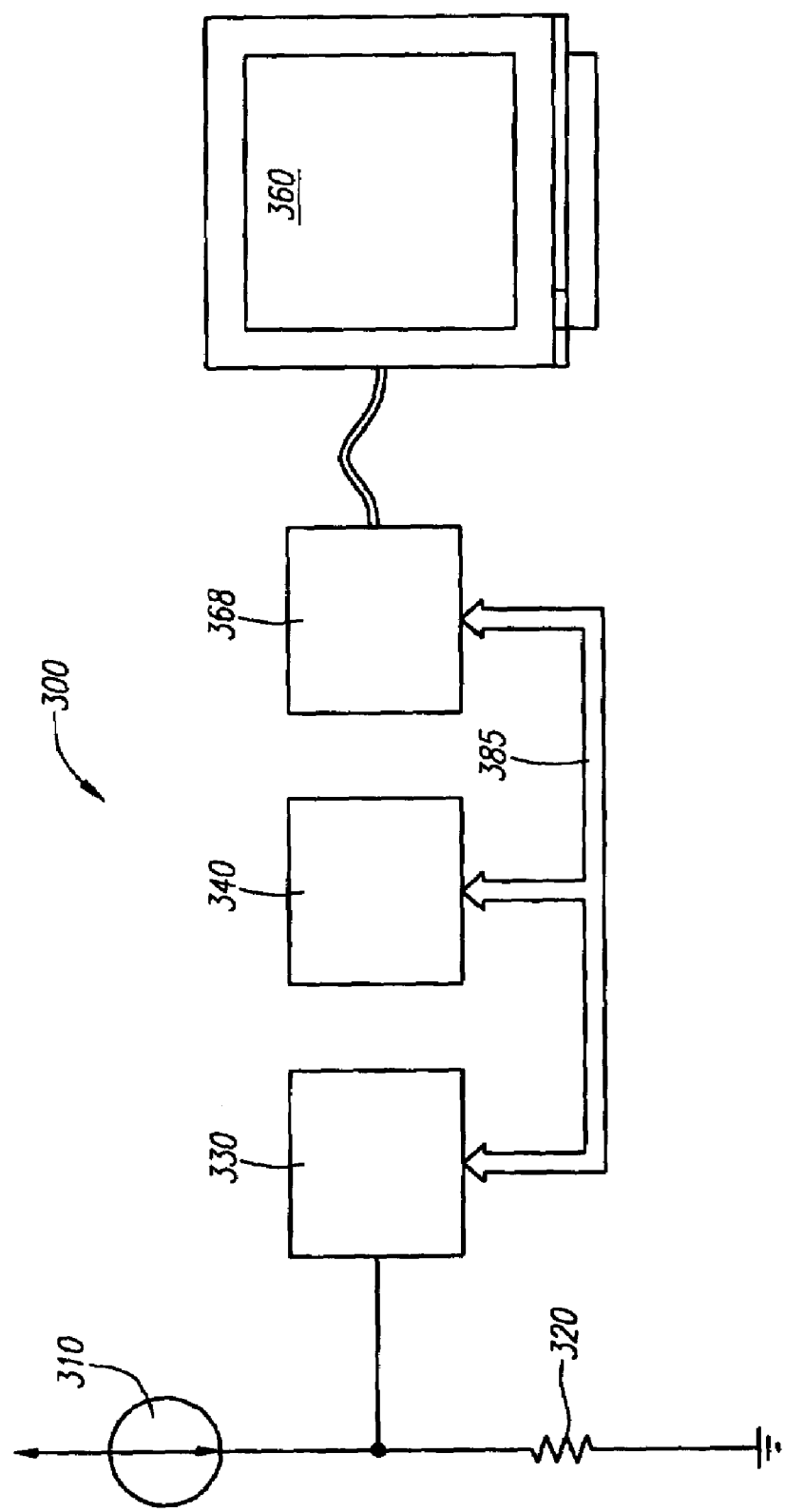
FIG. 3 is a simplified block diagram of a temperature-to-color converter with a color screen for displaying the temperature, in accordance with the present invention.

FIG. 3 is a simplified block-diagram of a temperature-to-color converter 300 that uses a color screen 360 and a video card 368 to render a color icon representing the temperature of a temperature sensor 310. The color screen 360, can be, for example, a computer monitor or a display installed in an automobile.

The other components of the converter 300 are identical or similar to the corresponding components of the converters 100 and 200 discussed above. The temperature sensor 310 and a resistor 320 produce a temperature-indicating voltage at their junction. An input/output (I/O) card 330, which includes an A/D converter, digitizes the temperature-indicating voltage, and allows a processor 340 to read the digitized voltage via a common control and data bus 385. Executing a preprogrammed algorithm, the processor 340 decides on the appropriate color for the temperature icon on the screen 360 and generates the appropriate Red, Green, and Blue color components.

In the Windows operating system, color properties of a display object can be specified as R, G, and B values, each with an intensity from 0 (no contribution) to 255 (full intensity). If the processor 340 runs under Windows, it is convenient to scale the three color components of the temperature icon so that each component also falls within the 0–255 numerical range. The Red, Green, and Blue color components of the temperature icon can then be written directly to the variables representing the color properties of this icon.

The instructions of the preprogrammed algorithm executed by the processor 340 (and by the software engines 140 and 240) can take the form of program code embodied in tangible media, such as hard drives, floppy diskettes, CD-ROMS, DVD, or any other machine-readable storage medium. The program code can also be transmitted over a transmission medium, for example, over electrical wiring or cabling, through fiber optics, through the Internet, wirelessly, or via any other form of transmission.

Figure 4:
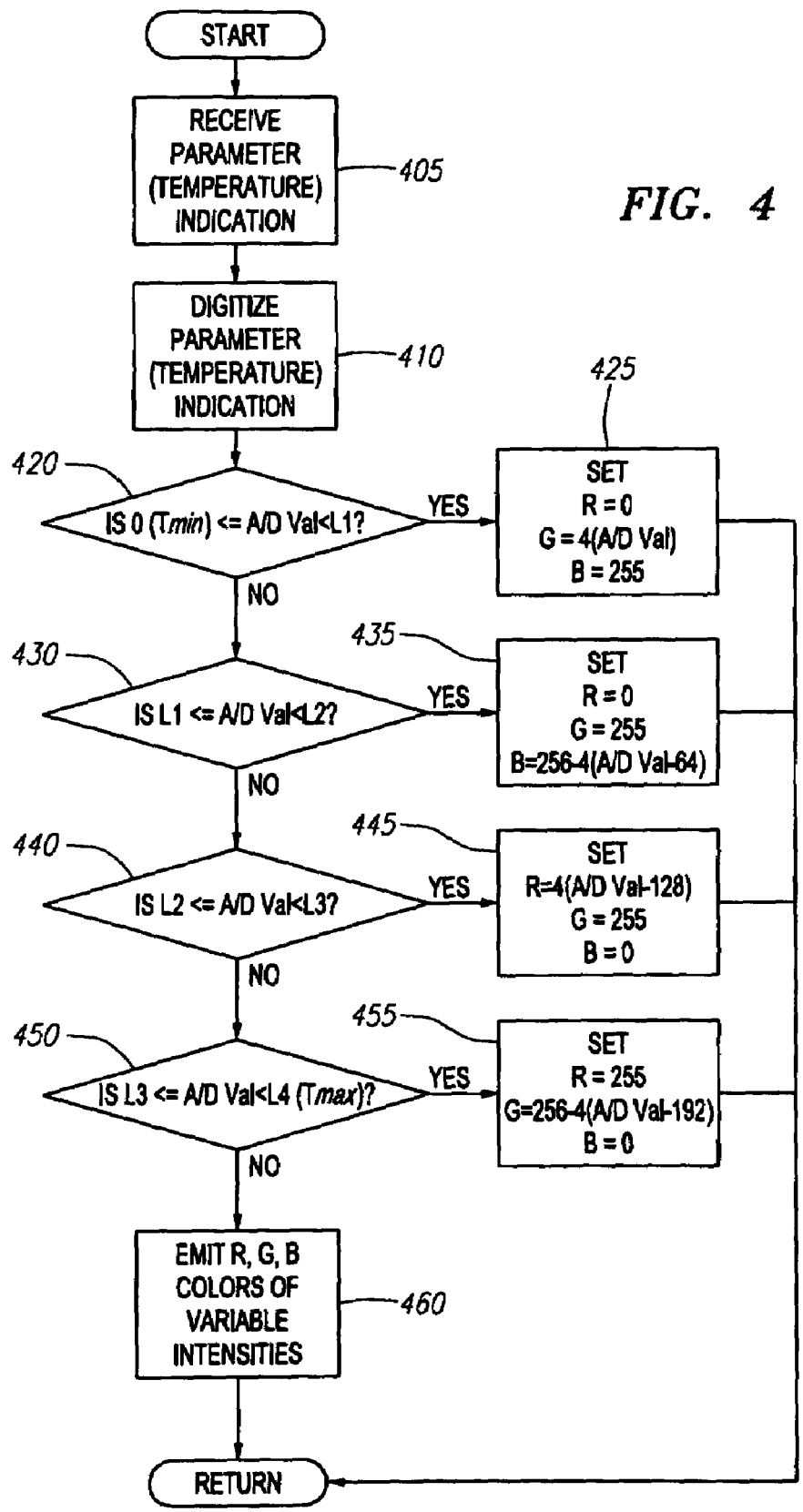
FIG. 4 is a high-level flowchart of some of the steps of a method for converting temperature (or another parameter) into color, in accordance with the present invention.

FIG. 4 illustrates a high-level flowchart of some of the steps of a method for converting temperature into color in accordance with the present invention. Beginning with step 405, a temperature indication is received from a temperature sensor. At step 410, the temperature indication is converted into a digital value between 0 and 255. In each of the steps 420, 430, 440, and 450, the digitized temperature is consecutively compared to a different temperature range, until the temperature is determined to fall within the comparison range. (More precisely, the digitized temperature indication is compared to a different range of values of digitized temperature indications.) If the digitized temperature indication falls within a specific range, the execution flow proceeds to one of the steps 425, 435, 445, or 455, where three color intensity values corresponding to the color of the range are set. For example, if the digitized temperature indication falls between $L_1$ and $L_2$ (i.e., within the comparison range of the step 430), the execution flow proceeds to the step 435 where the three color intensity values R (red), G (green), and B (blue) are set as illustrated in the box of step 435.

As shown in FIG. 4, the temperature ranges used in the comparisons of steps 425, 435, 445, and 455, cover the entire range of temperatures from the lowest temperature $T_{min}$ to the highest temperature $T_{max}$.

After the three color intensity values R, G, and B are set, three single-color light or color sources (red, green, and blue) of variable intensity are turned on, at step 460. The intensity of each source is determined by the color intensity value associated with the color of the source. The light emissions from the three light sources are then converged to appear as a single color to an observer.

Although the described temperature-to-color converters and methods for converting temperature use three monochromatic light outputs, the inventive converters and methods work well with both smaller and greater numbers of available colors. For example, the temperature-to-color converter 200 can employ a two-color LED instead of the tri-color LED 260. Moreover, the temperature displayed on the screen 360 of the converter 300 can be shown in shades of grey, forgoing the use of multiple colors.

The method of FIG. 4 is, of course, merely exemplary, with many additional variations possible on the basic scheme. For example, practically any number of colors or shades can be programmed for display. Also, many other algorithms for computing color intensities can be set in steps 425, 435, 445, and 455. In one embodiment in accordance with the present invention, the brightness of the light output depends on the temperature sensed—the higher the temperature, the brighter the light output. In another embodiment, the color intensities set in steps 425, 435, 445, and 455 correspond to the converged output of blue, green, orange, and red light, respectively. If the temperature-to-color converter is employed to monitor engine temperature, blue can signify a cold engine; green—an engine that has reached its normal operating temperature range; orange—a slightly elevated temperature, but still within operating limits of the engine; and red—an overheated engine. For monitoring temperature of an audio component, blue or green can be used to show that the audio component is well under its maximum temperature operating rating; orange can be used to show that the component's temperature of the component is approaching its upper limit; and red can indicate an imminent shutdown or burnout of the component. Where the converter is installed in a household refrigerator, a mobile refrigerator, or a vending machine, various shades of blue can signify very cold temperatures; shades of green—normal/cool temperatures; shades of orange—temperatures slightly above those customarily used for storage of food or for cold drinks; and red—temperatures too warm for the food or cold drinks. Similarly, in toaster ovens, blue can signify an oven that is turned off; green—a slightly warm oven; orange or brown—normal temperature for toasting bread; and red—very hot temperature that is likely to burn the contents of the oven. These are just some of the non-limiting examples of the applications of the temperature-to-color conversion schemes in accordance with the present invention. There are many other potential applications for monitoring temperature in appliances and elsewhere.

This document describes the inventive temperature-to-color converters and methods for temperature-to-color conversion in considerable detail for illustration purposes only. Neither the specific embodiments of the invention as a whole, nor those of its features limit the general principles underlying the invention. In particular, the invention should not be construed as limited to the specific temperature sensors, light emitters, software engines, or pulse-width modulators described. Many additional devices can be used to perform the functions of these elements. In particular, the processing of the temperature readings and computation of the color intensities can be performed by analog circuitry or by hard-wired digital logic, rather than by a processor. Indeed, some elements of the converters and steps of the conversion methods can be omitted altogether. More generally, the specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function has been reserved for the claims and their equivalents.

I claim:

1. A system for monitoring temperature, the system comprising:

a color display capable of displaying a temperature object as a combination of a plurality of basic constituent colors of variable intensities so that the temperature object appears as an object of one color;

an electronic device comprising:

an input that receives temperature readings indicative of the temperature, and a processor that determines a plurality of color intensity values for each temperature reading, one color intensity value per basic constituent color; and a video card coupled to the color display and to the processor to receive the plurality of color intensity values from the processor and cause the color display to output the temperature object as a combination of the plurality of basic constituent colors with each basic constituent color having intensity determined by the color intensity value of said each basic constituent color.

2. The system for monitoring temperature of claim 1, further comprising an analog-to-digital converter that receives analog indications of temperature, and digitizes the analog indications of temperature to convert the analog indications of temperature into the temperature readings.

3. The system according to claim 2, further comprising a temperature sensor causing the analog indications of temperature to vary with temperature of the temperature sensor.

4. The system according to claim 3, wherein the temperature sensor comprises a current source with substantially linear current-temperature dependence.

5. The system according to claim 3, wherein the temperature sensor comprises a thermistor.

6. The system according to claim 3, wherein the temperature sensor comprises a thermocouple.

7. The system according to claim 3, wherein the temperature sensor comprises a diode.

8. The system according to claim 3, wherein the temperature sensor comprises a resistance temperature device.

9. The system according to claim 3, wherein the plurality of basic constituent colors comprises red, green, and blue colors.

10. The system according to claim 2, wherein the processor runs under Windows operating system.

11. The system according to claim 3, wherein the temperature sensor is remote from the color display.

12. A method of displaying temperature as color, the method comprising:

step for obtaining temperature indications;

step for translating each temperature indication into a plurality of basic constituent colors by computing a plurality of color intensity values, one color intensity value per basic constituent color;

step for generating the colors of the plurality of basic constituent colors, each generated basic constituent color having intensity determined by the color intensity value of said each generated basic constituent color; and step for converging the generated basic constituent colors.

13. An article of manufacture comprising a machine-readable storage medium with instruction code stored in the medium, said instruction code, when executed by a processor of a system comprising the processor, an output device capable of displaying a plurality of basic constituent colors, and an input that receives indications of temperature, causes the processor to perform the following steps to display the temperature indications as color:

receiving temperature indications;

translating each temperature indication into a plurality of basic constituent colors by computing a plurality of color intensity values, one color intensity value per basic constituent color; and causing the output device to generate the colors of the plurality of basic constituent colors, each generated basic constituent color having intensity determined by the color intensity value of said each basic constituent color.

14. A method of displaying temperature of an automotive audio component as color, the method comprising:

obtaining temperature indications of the audio component;

translating each temperature indication into a plurality of basic constituent colors by computing a plurality of color intensity values, one color intensity value per basic constituent color;

generating the colors of the plurality of basic constituent colors, each generated basic constituent color having intensity determined by the color intensity value of said each basic constituent color; and converging the generated basic constituent colors.

* * * * *